US011810058B2

(12) United States Patent
Martinos et al.

(10) Patent No.: US 11,810,058 B2
(45) Date of Patent: Nov. 7, 2023

(54) CARRIER PATH PREDICTION BASED ON DYNAMIC INPUT DATA

(71) Applicant: Signal Ocean Ltd, London (GB)

(72) Inventors: Ioannis Martinos, Athens (GR); Dimitrios Tasoulis, Athens (GR); Michail Epitropakis, Athens (GR); Roussos Paschopoulos, Athens (GR); Emilio Frazzoli, Boston, MA (US)

(73) Assignee: Signal Ocean Ltd, London (GB)

( * ) Notice: Subject to any disclaimer, the term of this patent is extended or adjusted under 35 U.S.C. 154(b) by 290 days.

(21) Appl. No.: 17/228,452

(22) Filed: Apr. 12, 2021

(65) Prior Publication Data

US 2021/0233026 A1 Jul. 29, 2021

Related U.S. Application Data

(63) Continuation of application No. 16/000,641, filed on Jun. 5, 2018, now Pat. No. 10,977,605.

(51) Int. Cl.
*G06F 17/00* (2019.01)
*G06Q 10/0835* (2023.01)
(Continued)

(52) U.S. Cl.
CPC ....... *G06Q 10/08355* (2013.01); *H04L 67/10* (2013.01); *B63B 79/40* (2020.01); *G06F 16/29* (2019.01)

(58) Field of Classification Search
CPC ... G06Q 10/08355; H04L 67/10; B63B 79/40; G06F 16/29
(Continued)

(56) References Cited

U.S. PATENT DOCUMENTS

| 9,030,353 B2 * | 5/2015 | Kubota | G01S 13/937 |
| | | | 342/182 |
| 9,541,403 B2 * | 1/2017 | Ohmori | G01C 23/00 |

(Continued)

FOREIGN PATENT DOCUMENTS

| FR | 3053780 A1 * | 1/2018 | ........... G01C 23/005 |
| WO | WO-2016042932 A1 * | 3/2016 | ............. B63B 49/00 |
| WO | WO-2016160853 A1 * | 10/2016 | ............. B63B 49/00 |

OTHER PUBLICATIONS

Data Collection for Career Path Prediction Based on Analysing Body of Knowledge of Computer Science Degrees (Year: 2018).*

*Primary Examiner* — Ronnie M Mancho
(74) *Attorney, Agent, or Firm* — Knobbe Martens Olson & Bear LLP

(57) ABSTRACT

A method and system for managing carrier vessel information are provided. A carrier path and shipment planning system receives carrier information associated with individual carrier vessels from a plurality of carrier information sources. Based on the carrier information the carrier path and shipment planning system processes the carrier information to form complete path scenarios. The carrier path and shipment planning system associates control rules to the complete path scenarios to determine one or more candidate paths. The carrier path and shipment planning system can then generate various interfaces for identifying selected, ranked paths, information associated with a competitive marketplace and availability information for contracting for cargo shipment. A user can then further manipulate the user interfaces for scenario planning or filtering available selections.

21 Claims, 12 Drawing Sheets

(51) Int. Cl.
*H04L 67/10* (2022.01)
*G06F 16/29* (2019.01)
*B63B 79/40* (2020.01)

(58) Field of Classification Search
USPC .......................................................... 701/454
See application file for complete search history.

(56) References Cited

U.S. PATENT DOCUMENTS

| | | | | |
|---|---|---|---|---|
| 10,077,983 | B2* | 9/2018 | Okuda | G01C 21/20 |
| 10,281,920 | B2* | 5/2019 | Frazzoli | B60W 30/09 |
| 10,526,059 | B2* | 1/2020 | Morita | G01S 7/22 |
| 10,977,605 | B2* | 4/2021 | Martinos | G06Q 10/08355 |
| 11,112,793 | B2* | 9/2021 | Frazzoli | G05D 1/0061 |
| 11,378,955 | B2* | 7/2022 | Censi | G05D 1/0257 |
| 11,392,120 | B2* | 7/2022 | Censi | G05D 1/0257 |
| 11,460,842 | B2* | 10/2022 | Frazzoli | B60W 60/0059 |
| 2014/0309931 | A1* | 10/2014 | Ohmori | G01C 23/00 |
| | | | | 701/466 |
| 2015/0330803 | A1* | 11/2015 | Okuda | G01C 21/20 |
| | | | | 701/538 |
| 2017/0087996 | A1* | 3/2017 | Lin | B60L 53/00 |
| 2017/0253308 | A1* | 9/2017 | Morita | G01S 7/12 |
| 2017/0277193 | A1* | 9/2017 | Frazzoli | B60W 60/0011 |
| 2019/0370746 | A1* | 12/2019 | Martinos | H04L 67/10 |
| 2023/0081665 | A1* | 3/2023 | Izumikawa | B63B 49/00 |
| | | | | 701/21 |

* cited by examiner

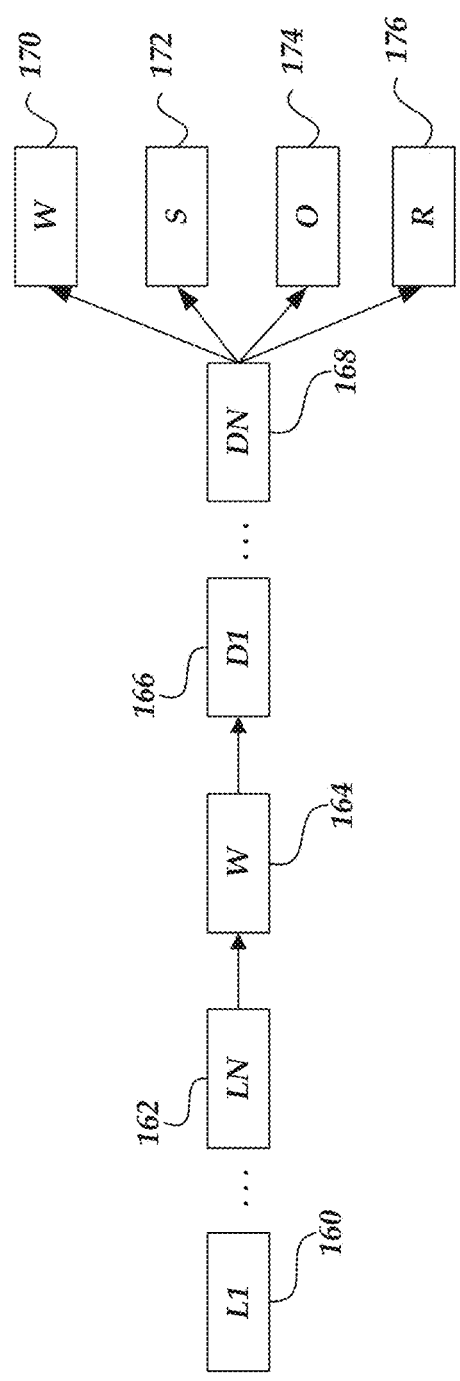
Fig.1B1
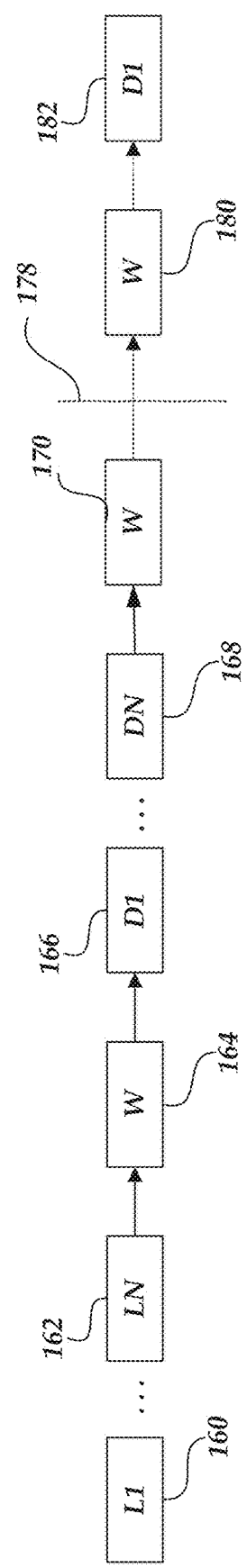
Fig.1B2

Fig. 9.

FILE EDIT VIEW HELP

902

ENTER SHIPPING PORT — 904
MIAMI — 906
ENTER SHIPPING DATE — 908
1/1/2018 — 1/15/2018 — 910
ENTER DESTINATION PORT — 912
ROTTERDAM — 914
CARGO TYPE — 916
GRAIN — 918

AVAILABLE CARRIERS — 918

☐ VESSEL 1 – CARRIER 1
☐ VESSEL 2 – CARRIER 1
☐ VESSEL 3 – CARRIER 1
☐ VESSEL 1 – CARRIER 2
☐ VESSEL 1 – CARRIER 3
☐ VESSEL 2 – CARRIER 3

920

VALUE INDEX   1.10

CARRIER PATH PREDICTION BASED ON DYNAMIC INPUT DATA

FIELD OF THE INVENTION

This invention relates to a system and method for carrier path prediction of the type which may be used to predict the paths of vehicles or vessels which can accept cargo for shipment, to enable third parties to select a carrier for shipping cargo.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

With regard to the shipping industry, various content providers may provide information regarding the location, destination or general availability for identifiable carrier equipment, such as cargo carriers or shipping vessels. For organizations wishing to understand a path of travel, such as destinations, waypoints, etc., for any particular carrier or carrier equipment, information available from different content providers, or sources, may be incomplete or otherwise inconsistent. Additionally, information provided to different organizations may vary based on availability or business relationships.

Generally described, a carrier organization can provide carrier equipment, or cargo carriers, such as vehicles or vessels, that can accept cargo for shipment. With regard to ocean going vessels, individual travels of a vessel may be associated with a set of data, generally referred to as a voyage, that is defined by a starting location and an ending location. In between the starting location and the ending location, the set of data corresponding to a voyage can also include loading locations that define specific locations for taking on cargo, waypoints that define locations in which the vessel may pass during travel, discharge locations that define specific location for discharging at least portions of cargo, and stopping locations that define specific locations in which vessel travel may be temporarily paused. In some embodiments, voyages can be dynamic in nature as a carrier organization may adjust one or more locations (e.g., waypoints, stopping locations, etc.) during a voyage.

To maximize revenue, carrier organizations will attempt to contract with one or more third parties to transport cargo during a defined voyage. In a typical scenario, the capacity of individual vessels to accept cargo throughout different aspects of a voyage can change. For example, an individual vessel may have no capacity at the beginning of a voyage by taking on a full cargo load at the starting location. During the voyage, the vessel may traverse one or more discharge locations in which the vessel gains capacity to accept additional cargo as it travels to additional locations in the voyage, such as waypoints, discharge locations, stopping locations, etc. In this example, the carrier organization may wish to take on additional cargo contracts to supplement or replace cargo as it is discharged throughout the voyage. In another example, a vessel may have full capacity to accept cargo as the vessel begins a voyage and travels to an established loading location to take on cargo. In this example, the carrier organization may wish to take on additional cargo that can be transported and discharged prior to arriving at the loading location.

Various third-party organizations wishing to secure shipping services for cargo ("third-party shipper") to transport a specific cargo from a first location to a second location attempt to obtain as much information as possible to negotiate and secure cargo shipping contracts with individual carrier organizations. Third-party shippers can request information regarding expected voyage locations from a carrier organization. Third-party shippers can also request information associated with individual vessels such as an Automatic Identification System ("AIS") system. Illustratively, AIS systems can include static information, such as ship size, dynamic information, such as current speed, course, and position, and voyage information, such as estimated time of arrival predicted by a captain. Additionally, third-party shippers can request information from various organizations that may be involved in aspects of the vessel or shipping, such as brokers utilized to negotiated cargo contracts, ports of call, and the like in order to locate a vessel suitable for the cargo and route they require.

Third-party shippers may have access to different types of information or different levels of information from a specific information source. For example, a larger volume third-party shipper or carrier organization may negotiate with shipping organizations to get more detailed voyage information, such as hourly reports regarding current location and path of travel. In contrast, a lower volume third-party shipper or carrier organization may only have access to general publicly available voyage information that is provided once a day or once a week. Information sources do not typically confirm to a defined format or standard and are often transmitted via different forms of communication (e.g., textual information via electronic mail and online communication platforms vs. published in a Web site).

In some known designs for ship location prediction systems, such as described in Parolas et al., *Prediction of Vessels' Estimated Time of Arrival (ETA) Using Machine Learning—A Port of Rodderdam Case Study*, 6th Annual Meeting of the Transportation Research 46 Board (January 2017), a potential path or ETA for a vessel can be predicted using a single source of information, such as AIS information. Such systems attempt to supplement inherent errors associated with a single source of information.

SUMMARY OF THE INVENTIONS

An aspect of at least one of the embodiments disclosed herein includes the realization that carrier path prediction systems that rely on a single source of information suffer from drawbacks that can be overcome by analyzing information from a plurality of sources and identifying and compensating for incomplete or inconsistent information regarding voyages for individual carriers. For example, a shipping professional might receive from one or more information sources, general information that a particular vessel will be in Asia, without any details regarding specific ports of call or timeframes for travel. In another example, a generally public report may indicate that a vessel nearby the southern portion of the United States is traveling toward Central American or South American ports of call while alternative sources may indicate that the path of travel is toward the European ports of call. Accordingly, single information source systems do not attempt to address inherent issues associated with multiple information sources or dynamically variable information sources. Rather, single source systems typically attempt to correct issues associated with weather induced delays or other delays experienced during a voyage.

The dynamic and incomplete nature of carrier information also presents various technical problems for third-party shippers attempting to contract with carriers to transport cargo. For example, individual information sources about one or more carrier organizations or vessels can be formatted and provided in manner that requires specialized knowledge or procedures. Such diversity in formatting and sources creates inefficiencies in processing the vessel voyage information and in providing available information in a way that facilitates assessment of carrier availability. Additionally, the potential for inconsistent or incomplete information creates additional processing and decision making inefficiencies for selecting carrier organizations and individual vessels. Still further, the potential variances in accessibility or availability of carrier information provided by third-party shippers create additional inefficiencies by varying carrier information available to individual third-party shippers. These and other factors make the prediction of routes of potentially available carrier vessels process intensive and often lacking in accuracy. Other problems and technical difficulties may be apparent to one skilled in the relevant art and accordingly are not limited to the illustrative inefficiencies described above.

Another aspect of at least one of the embodiments disclosed herein includes the realization that methods and systems for predicting cargo ship voyage paths can be improved to provide significantly faster and more accurate results by analyzing vessel voyage information from multiple sources and identifying common anchor points among a plurality of initial partial voyage paths, then resolving complete path scenarios based at least in part the identified common anchor points.

Another aspect of at least one of the embodiments disclosed herein includes the realization that providing a system that can generate voyage path and shipment availability predictions for more than one hundred vessels for at least two weeks into the future in less than one-half hour can provide a shipping professions with a significant advantage in the ability to identify the best vessel for a particular proposed shipment. For example, some modern shipping professionals can be provided with vessel information updates as frequently as every one-half hour, from multiple vessel information sources, regarding over one hundred vessels. Currently, some such professionals compete with other similarly positioned professionals, each attempting to find a vessel that can satisfy a particular shipment as quickly as possible. Such a shipping professional might receive information regarding a number of vessels that could potentially satisfy a shipment, one-half hour later, and before the professional contracts with an appropriate vessel, new information arrives indicating a different set of vessels that might be available. This higher frequency cycle of information flow can make it difficult for a shipping professional to successfully investigate potential vessel availability with the best, most recently updated information.

Another aspect of at least one of the embodiments disclosed herein includes the realization that process of analyzing and indexing vessel information received by shipping professionals, and subsequent prediction of vessel voyage paths, can be significantly improved by providing a service for indexing non-indexed vessel information. For example, some shipping professionals receive large numbers of communications with vessel information, many of which can be in for form of non-indexed full text, images of text, and can be formatted in various different ways. Some such communications can come be transmitted to shipping professional in the form of emails, faxes, or other forms of communications.

Thus, in some embodiments, a (system/method) for predicting shipping vessel availability can include a natural language vessel information parser configured to index, non-indexed vessel information from a plurality of different sources and formatted in a plurality of different formats into at least vessel name data, port name data, and vessel status data. In some embodiments, the methods and systems can recognize abbreviations and acronyms that are unique to the shipping industry. As such, a professional can input large numbers of emails into the vessel availability prediction system, including emails that might have non-indexed, variably formatted, full text or images of text relating to a large number of vessels, and receive predicted availability solutions with only a short wait. For example, in some embodiments, the systems and methods can provide predicted availability results for over a thousand vessels, extending more than two weeks into the future, using computer hardware that is currently widely available on the commercial market. Further improvements can be obtained by streamlining the prediction process by identifying common anchor points among a plurality of initial skeleton voyage paths and using such anchor points to reduce the number of calculations required for determining complete voyage paths. For example, using such anchor point analysis can reduce processing time for predicting vessel availability for over one hundred vessels for greater than two weeks into the future, using computer hardware that is currently widely available on the commercial market. Such rapidly generated results can further better enable a shipping professional to investigate potential shipping contracts based on up-to-date information with the vessel operators likely to agree to the most favorable terms for shipment.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 1B1 and 1B2 are block diagrams illustrative of voyage state diagrams defining one or more locations for a vessel in accordance with some embodiments;

FIG. 2 is a block diagram illustrative of components of user device for requesting and receiving content associated with carrier path determinations in accordance with some embodiments;

FIG. 9 is a block diagram illustrative of a user interface generated on a user device identifying carrier information in accordance with some embodiments.

DETAILED DESCRIPTION

Figure 1A:
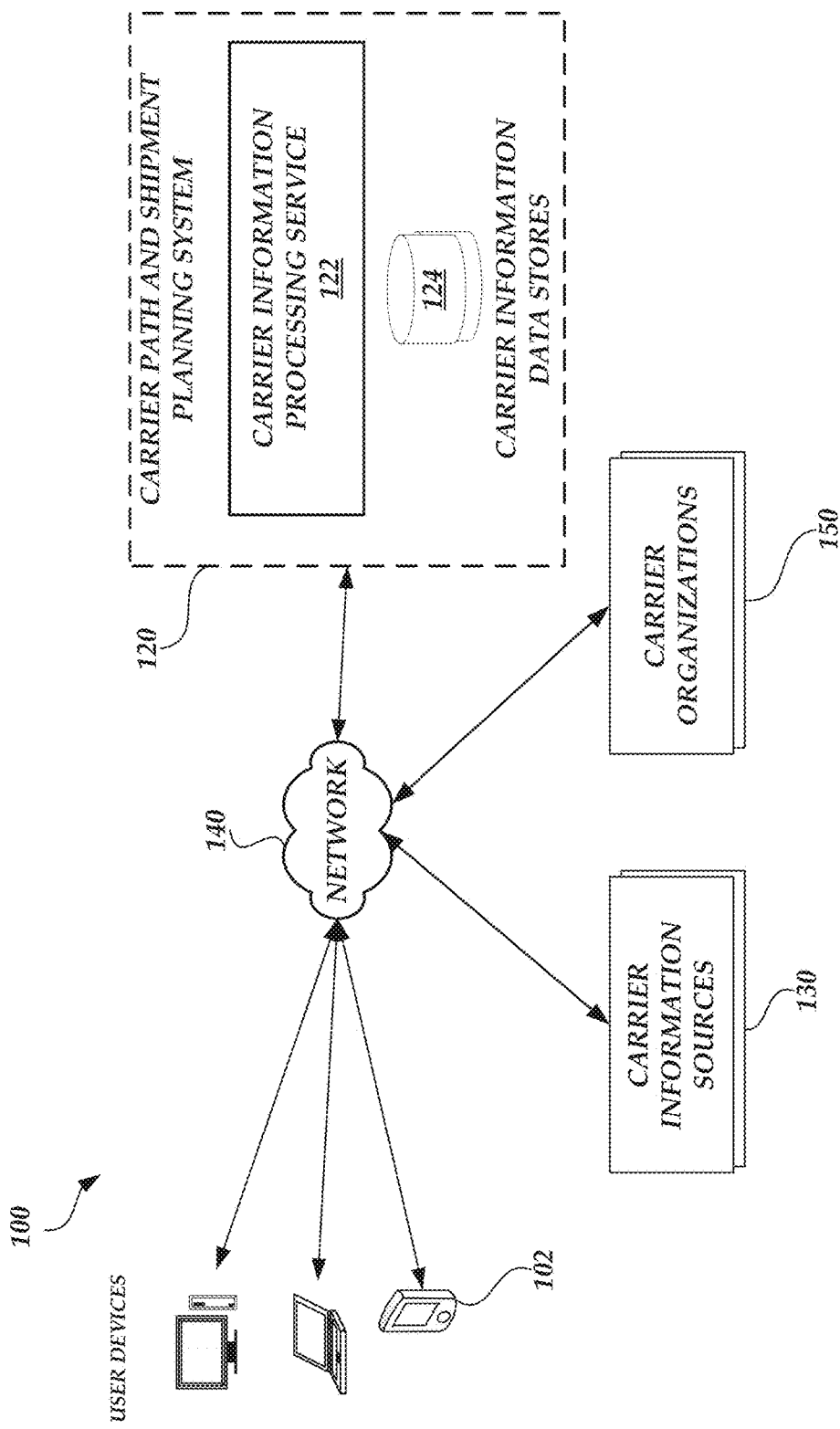
FIG. 1A is a block diagram of a carrier planning environment that includes one or more user devices, one or more carrier information sources, a carrier path and shipment planning system and carrier organizations in accordance with some embodiments.

To address at least in part some of the above-described deficiencies associated with managing one or more aspects of carrier organizations and third-party shippers, aspects of the present application correspond to a method and system for managing carrier vessel information. More specifically, aspects of the present application correspond to a carrier path and shipment planning system for processing carrier information sources to predict one or more paths for one or more carrier vessels. The carrier information sources can correspond to at least partial information related to one or more carrier equipment, such as vessels. For any given vessel, the carrier information can illustratively include one or more of an automatic identification system ("AIS") information source relating to location information for vessels, market intelligence ("MI") information source(s) related to information regarding a next destination/operation of vessels, fixtures information source(s) related to loading and discharging information for vessels, port authorities information source(s) related to loading and discharging information for vessels, customer user information source(s) related to information about own vessels and historical voyage information related to previous voyage information for vessels.

Based on the carrier information source information, the carrier path and shipment planning system processes the carrier information to generate a set of skeleton scenario paths that identify possible voyage information corresponding to individual carrier information sources. Illustratively, the carrier path and shipment planning system further identifies anchoring information along with the skeleton scenario paths that serves as reference information for comparing and further processing the skeleton scenario paths.

Utilizing the generated skeleton scenario paths and anchoring information, the carrier path and shipment planning system processes the set of skeleton scenario paths to create one or more complete scenarios. The complete scenarios represent various combinations of the skeleton scenario paths that may be possible. The carrier path and shipment planning system can further process any outstanding skeleton scenario paths and assess penalty models for completed paths. The penalty models illustratively characterize weights or scores for possible completed paths that characterize the potential for errors in the calculated path. These penalty scores may be based on the amount of information used to generate each skeleton path and thus relate to the likelihood of that skeleton path being accurate. Based on the penalty models, the carrier path and shipment planning system utilizes control rules that reflect specific business rules and assigns a score that determines the degree of suitability/matching of the rule onto the path. The carrier path and shipment planning system also assigns scores that define whether a future path is feasible or not.

Based on the further processing, the carrier path and shipment planning system then ranks the paths and determines one or more candidate paths. The carrier path and shipment planning system can then generate various interfaces for identifying selected, ranked paths, information associated with a competitive marketplace and availability information for contracting for cargo shipment. A user can then further manipulate the user interfaces for scenario planning or filtering available selections.

In accordance with one or more aspects of the present application, the carrier path and shipment planning system can continue to leverage the information sources and level of information that is available to individual third-parties. Accordingly, it may be possible for the results of the processing of the shipping information sources to have different outcomes for different third-parties based on different shipping information or levels of shipping information. For example, a first third-party shipper may have detailed access to waypoint location information or destination location information while a second third-party shipper may have only generic access to the same type of information.

Based on aspects of the present application, the carrier path and shipment planning system will be described as facilitating various applications or examples for associating paths for various vessels based on a dynamic set of carrier information sources. Such examples are illustrative in nature and should not be construed as limiting or exhaustive of all possible applications of one or more aspects of the present application.

FIG. 1A illustrates a general carrier planning environment 100 for managing information associated with one or more carrier organizations and one or more third-party shipping organizations. The carrier planning environment 100 includes a plurality of user devices 102 utilized by individual users, generally referred to as user computing devices, to request access to carrier and shipping information from a carrier path and shipment planning system 120. Illustratively, the carrier path and shipment planning system 120 receives carrier and shipping information from a plurality of information sources 130 available to each individual third-party and generates one or more paths for carrier equipment such as vessels to facilitate the selection and contracting of vessels by third-party shippers. The carrier path and shipment planning system may receive carrier and shipping information specific to a third party to be processed in response to a request from a third party shipper. Additionally, the carrier path and shipment planning system 120 can receive configuration information, such as data processing rules, from computing devices associated with one or more carrier organizations 150.

Figure 2:
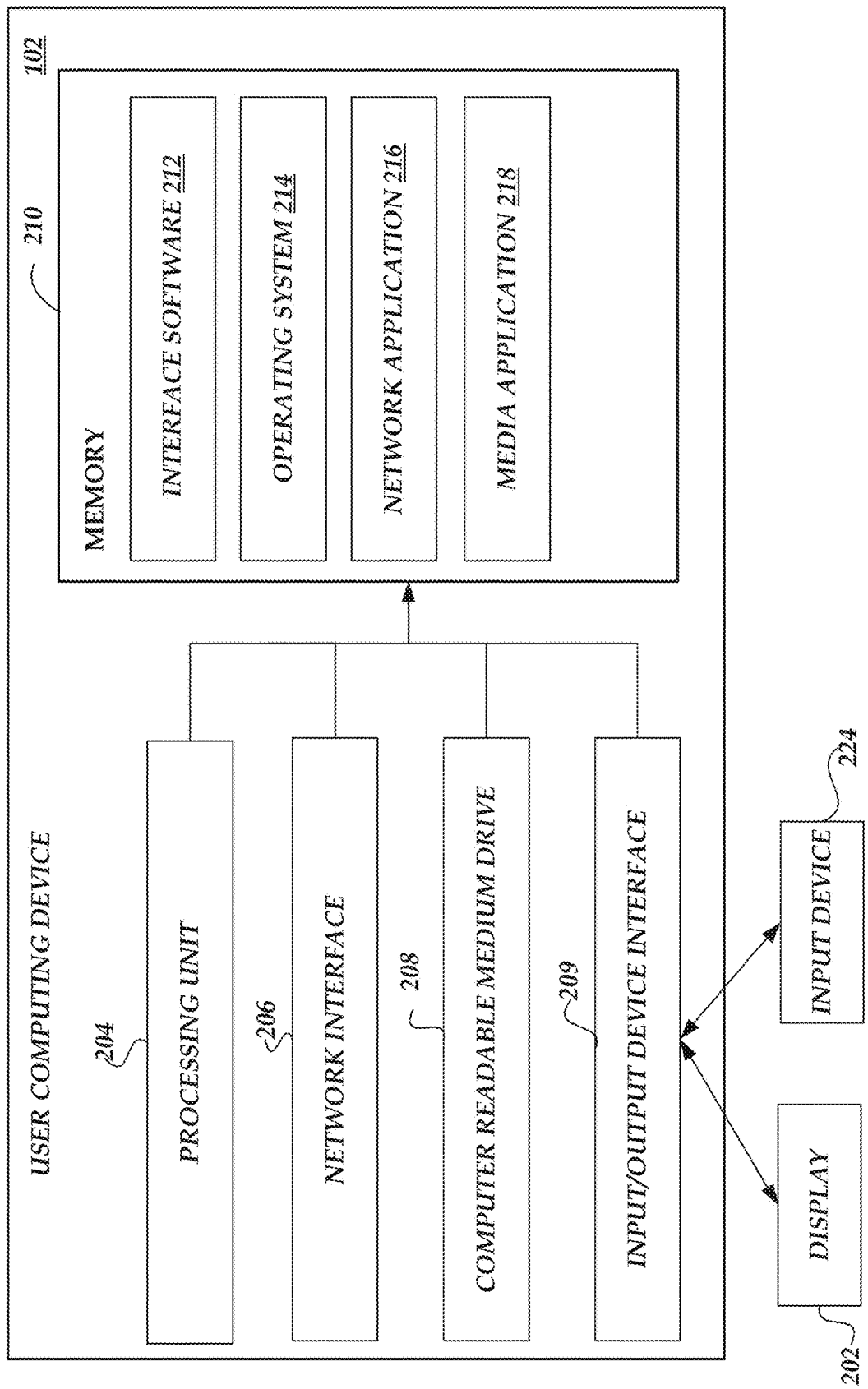

With reference to FIGS. 1B1 and 1B2, as described above, individual vessel voyages can be defined as a series of locations. Illustratively, individual locations in a voyage can be further characterized based on one or more actions that relate, or otherwise impact, the ability for the vessel to contract with third-party shippers. In one aspect, as illustrated in FIG. 1B1, a voyage can include a set of locations that are well-established or have otherwise already occurred in the past. For example, a vessel may begin a voyage by a set of load locations 160, 162 in which the vessel takes on cargo. In this illustrative example, the vessel may be attributed to no capacity or little capacity to take on additional cargo. Additionally, the voyage can include one or more waypoint locations 164 in which the vessel has passed or which have been attributed to the vessel. Thereafter, the voyage can include one or more discharge locations 166, 168 in which cargo has been discharged. In this illustrative example, upon completion of the discharge, the vessel can take on increasing ability to take on cargo.

For purposes of illustration, for purposes of predicting future locations, after discharge location 168, a carrier path and shipment planning system 120 can receive information that may be indicative of one or more different types of activities for a possible location that may be attributed to the illustrated voyage. More specifically, illustratively, for a next location, the location, can be a waypoint location 170, a stop location 172, an orders stop location 174, a repair location 176. Each of these potential illustrative location types represent different branches/possibilities for the voyage, which can influence other possible future locations. As will be described in greater detail below, if carrier information is incomplete, inconsistent or otherwise ambiguous, the carrier path and shipment planning system 120 can generate multiple potential paths representing different branching outcomes and attribute confidence and feasibility scores for the different modeled paths.

Turning to FIG. 1B2, assume that branch discussed above with regard to FIG. 1B1, corresponds to a waypoint location 170. Based on this determination, the carrier path and shipment planning system 120 can project additional future locations 178, such as waypoint 180 and 182. The complete path illustrated in FIG. 1B2, can then be ranked and provided graphically to a user to facilitate the selection of a carrier vessel for shipment. One skilled in the relevant art will appreciate that voyages do not necessarily need to be in the order illustrated in FIGS. 1B1 and 1B2.

Returning to FIG. 1A, user computing devices 102 may include any number of different computing devices capable of communicating with a communication network 140 via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, electronic appliance, controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

The communication network 140 may be any wired network, wireless network, or combination thereof. In addition, the network 140 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While user devices 102 are depicted as having a single connection to the network 140, individual components of the user devices 102 may be connected to the network 140 at disparate points. Accordingly, communication times and capabilities may vary between the components of FIG. 1.

The content delivery environment 100 can include a plurality of carrier information sources 130 for delivering input signals to the carrier path and shipment planning system 120. The carrier information sources 130 may include one or more servers for delivering content, a data store for maintaining content and a communication manager for facilitating communications to the carrier path and shipment planning system 120 over network 140. Additionally, the carrier information sources 130 can provide carrier information to the carrier path and shipment planning system 120, such as via an API (Application Programming Interface).

In accordance with embodiments, the carrier path and shipment planning system 120 includes a set of computing components that implement a carrier information processing service 122 for receiving and processing content provided by the carrier information sources 130 (or other sources). Aspects of the carrier information processing service 122 will be described with regard to FIG. 3. The carrier path and shipment planning system 120 can include one or more data stores 128 for receiving and maintaining carrier information, such as a database in which carrier information for each individual carrier can be maintained.

It will be appreciated by those skilled in the art that the carrier path and shipment planning system 120 may have fewer or greater components than are illustrated in FIG. 1. Thus, the depiction of the carrier path and shipment planning system 120 in FIG. 1 should be taken as illustrative. For example, in some embodiments, components of the carrier path and shipment planning system 120 may be executed by one more virtual machines implemented in a hosted computing environment. A hosted computing environment may include one or more rapidly provisioned and released computing resources, which computing resources may include computing, networking or storage devices. Additionally, the data stores 124 may be implemented in a distributed manner that encompasses multiple computing devices geographically or logically distinct.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1A and the carrier path and shipment planning system 120. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the carrier path and shipment planning system 120

Figure 3:
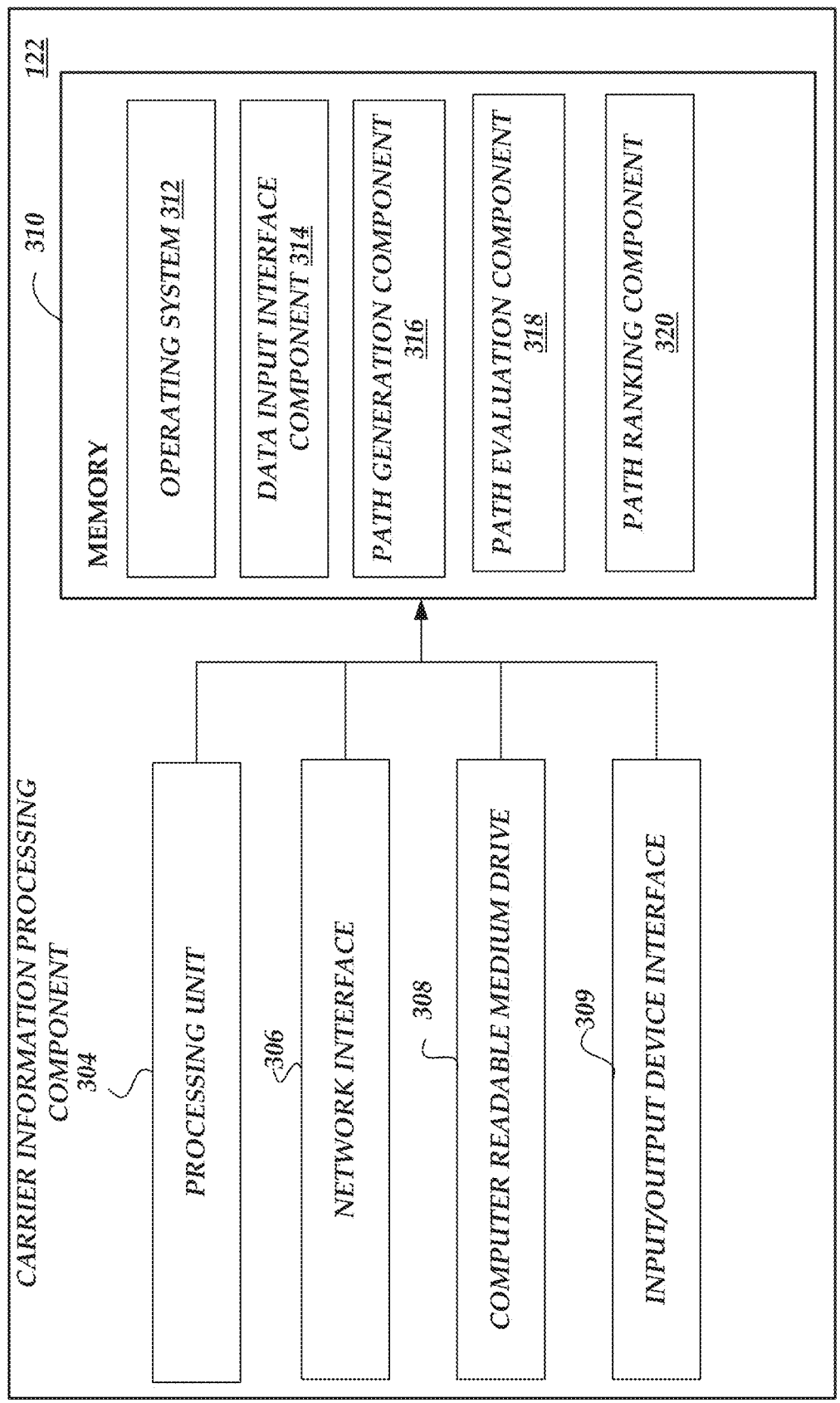
FIG. 3 is a block diagram illustrative of components of a carrier path and shipment planning system in accordance with some embodiments.

FIG. 3 depicts one embodiment of an architecture of an illustrative carrier information processing service 122 for implementing the carrier path and shipment planning system 120 described herein. The general architecture of the carrier information processing service 122 depicted in FIG. 3 includes an arrangement of computer hardware and software components that may be used to implement aspects of the present disclosure. As illustrated, the carrier information processing service 122 of the carrier path and shipment planning system 120 includes a processing unit 304, a network interface 306, a computer readable medium drive 308, an input/output device interface 309, all of which may communicate with one another by way of a communication bus. The components of the carrier information processing service 122 may be physical hardware components or implemented in a virtualized environment.

The network interface 306 may provide connectivity to one or more networks or computing systems, such as the network 14 of FIG. 1A. The processing unit 304 may thus receive information and instructions from other computing systems or services via a network. The processing unit 304 may also communicate to and from memory 310 and further provide output information for an optional display via the input/output device interface 309. In some embodiments, the carrier information processing service 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 312 that provides computer program instructions for use by the processing unit 304 in the general administration and operation of the carrier path and shipment planning system 120.

The memory 310 may further include computer program instructions and other information for implementing aspects of the present disclosure. For example, in one embodiment, the memory 310 includes interface software 314 for receiving and processing requests from user devices 102, configuration information from carrier organizations 150 and carrier information from carrier information sources 130. Memory 310 includes three components for processing carrier information to generate processed path information as will be described below. More specifically, the memory 310 includes a path generation component 316 to generate skeleton scenario paths from carrier information, a path evaluation component 318 to process a set of skeleton scenario paths into complete paths and a path ranking component 320 to score, sort and rank possible paths. These components represent various logical components implementing one or more of the processes identified in the present application. However, such components are illustrative in nature and the functionality associated with the various components can be implemented in separate computing devices or in various combinations thereof.

Figure 4A:
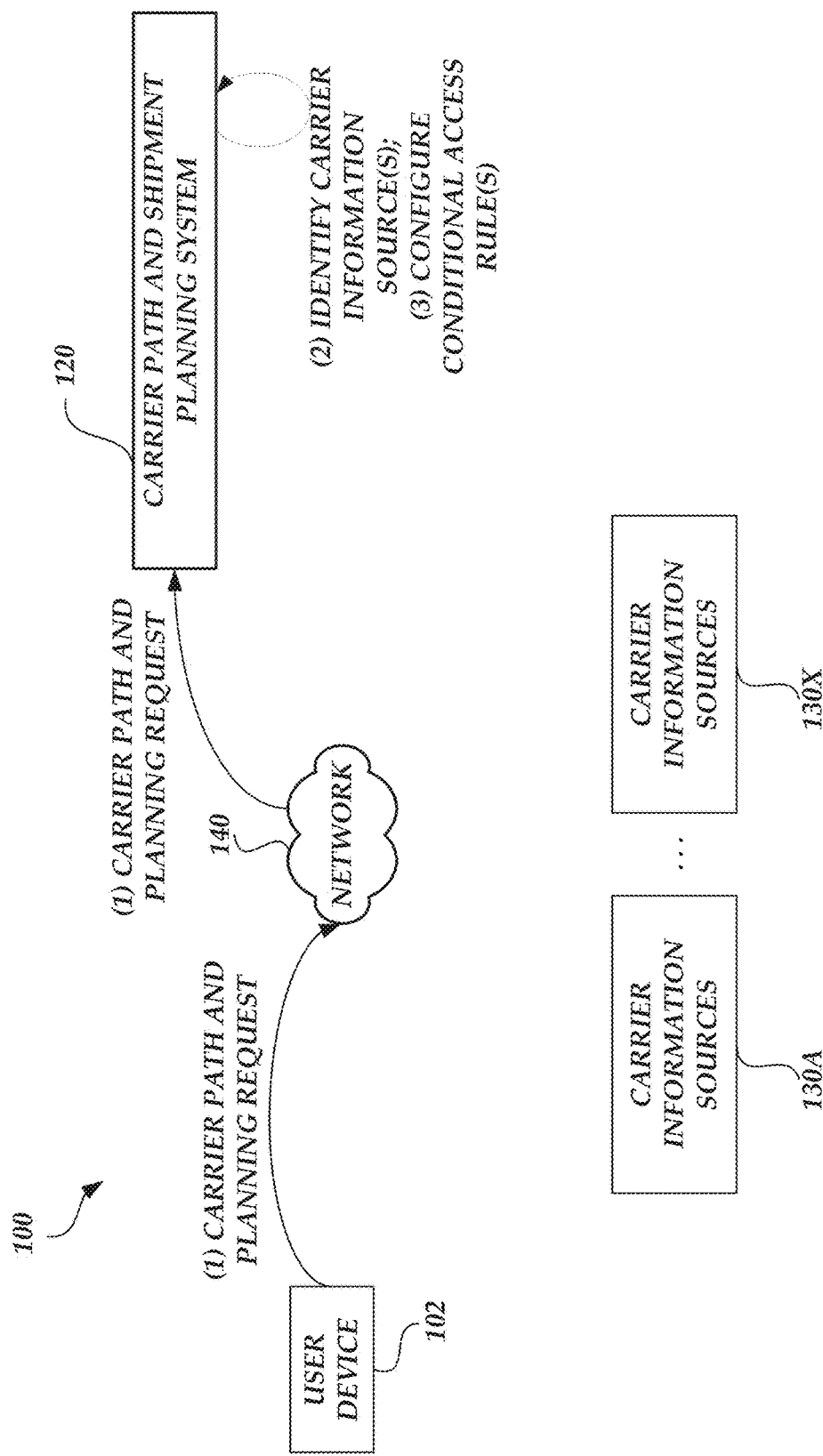
FIGS. 4A-4B are block diagrams of the carrier planning environment of FIG. 1 illustrating the collection of carrier information sources and processing of carrier information to generate carrier path information in accordance with some embodiments.
Figure 4B:
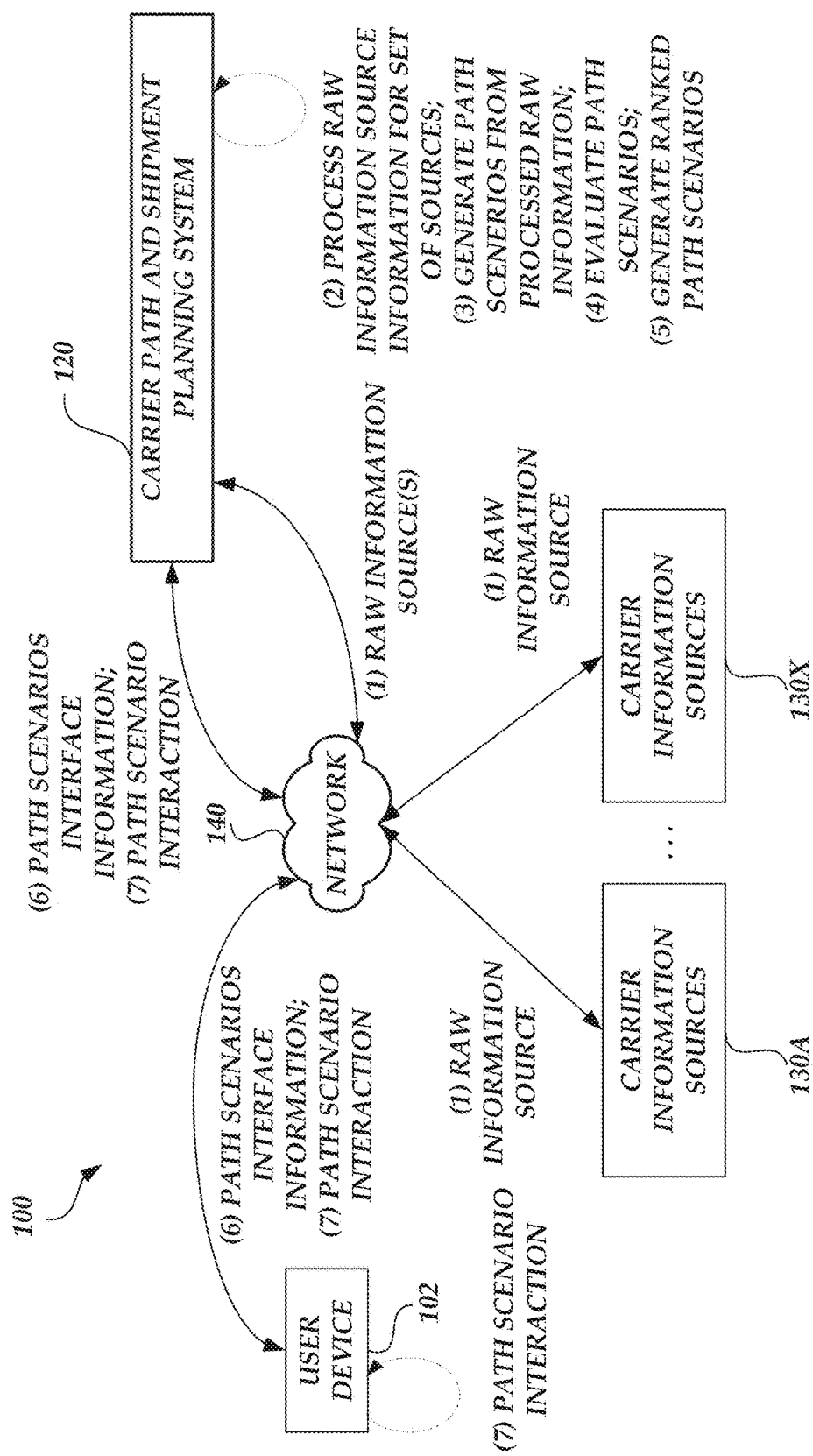

Turning now to FIGS. 4A-4B, an illustrative interaction for the processing of carrier information by the components of the carrier planning environment 100 will be described. For purposes of illustration, the components of carrier planning environment 100 have been simplified. However, one skilled in the relevant art will appreciate that interaction between the components can include additional communications and may involve additional components not specifically illustrated in the FIGS. 4A and 4B.

With reference to FIG. 4A, the initial configuration of the carrier information processing service 122 will be described. As previously described, in one aspect of the present application, each user of the carrier information processing service 122, such as a third-party shipper, can have different access to carrier information in the form of different sets of carrier information sources 130 or different levels or types of information from the same carrier information source. For example, a first user may have access to shipping reports identifying available to carriers at a port provided by a specific third party broker while a second user may not have access to the same report. In another example, two users may have access to the same report/information provided by an information source. However, the first user may only have access to generally public information available to large set of users (including public information). A second user may have access to much more detailed information from the same source that can include additional or alternative information not available to the first user (or similar users).

As illustrated in FIG. 4A, in one embodiment, to access the carrier information processing service 122, at (1), the user device 102 transmits a carrier path and planning request to the carrier information processing service 122. Illustratively, the transmission of the request can include various protocols to establish secure communications and authenticate the user computing device with the carrier information processing service 122. Additionally, the request can identify potential carrier information sources (or credentials), levels of information access (or credentials), and the like. In some embodiments, the carrier information processing service 122 can maintain and utilize profiles so that the request from user device 102 would not necessarily require the transmission of credentials each time. Additionally, for purposes of the illustration, the request can also identify search criteria (or access default criteria) that can identify particular ports of interest, dates of shipping, types of cargo, and the like.

At (2), the carrier information processing service 122 processes the request from the user device 102 and identifies the carrier information sources 130. Illustratively, the identification of the carrier information sources can be based on credentials included in the request or maintained in a profile. In other embodiments, the carrier information processing service 122 can process information about the user computing device 102 request to identify information sources including information sources not identified by the user or user request. For example, individual information sources may provide criteria that indicate user eligibility for information.

At (3), the carrier information processing service 122 configures conditional access rules that identify the level or type of information that users are able to access. As described above, in one embodiment, the carrier information processing service 122 can filter or otherwise assign information provided by carrier information sources 130 based on conditional accesses rules. The conditional access rules illustratively facilitate the carrier information processing service 122 processing received carrier information based on user credentials, time of day, and other criteria. The conditional access rules can be maintained on a per user basis, per carrier information source basis or both.

Turning now to FIG. 4B, illustrative interaction for the processing of carrier information will be described. At (1), the carrier information processing service 122 and a plurality of information sources 130 exchange raw information sources related to the travel of carrier equipment, such as vessels. By way of example, the plurality of information sources can include one or more AIS information sources that described various information about the vessels, including vessel attributes, location, movement, direction and stated voyage. The plurality of information sources can also include marketing intelligence system information sources that can include various information regarding the intended voyage locations for identifiable vessels or carriers provided by independent third-parties, such as broker reports. The plurality of information can also include one or more fixture information sources that identify information regarding cargo loading/discharging and capacity for identifiable vessels. The plurality of information sources can further include one or more port authority information sources that identify various information regarding actions associated with identifiable vessels, cargo and attributable actions (e.g., loading, discharging, etc.). The plurality of information sources can also include one or more user input information sources that correspond to custom or manually entered information about identifiable vessels. The plurality of information sources can also include one or more historical information sources for relaying information regarding historical voyages for identifiable vessels or carriers.

As will be explained below, the carrier information processing service 122 can receive multiple information, process the information to form one or more target voyages for identifiable vessels. In some embodiments, the information sources can include conflicting or incomplete information. Although the operation of the carrier information processing service 122 will be described with regard to the plurality of information sources, one skilled in the relevant art will appreciate that the plurality of information sources is not required to be any particular combination of the illustrative sources utilized in the illustrative examples. In some embodiments, the information sources 130 may transmit raw information sources directly to the carrier information processing service 122 based on a request (pull) or registration (push). Such transmissions may be based on receipt of new information, time of day, and the like. Additionally, in other embodiments, the information sources 130 can implement various additional interactions or communication protocols, such as APIs, to facilitate the transmission of carrier information.

At (2), the carrier information processing service 122 processes the various raw information sources from the carrier information source 130. Illustratively, each raw information source can be formatted and transmitted in a different manner. Accordingly, processing the raw information to extract or parse relevant information for forming potential voyage paths may be unique for each type of information source. For example, AIS information can include vessel location information and additional information about the vessel. MI information can include unique codes or other nomenclature for each third-party reports. Processing can include extraction and removal of redundant information. Fixture information can also include unique codes or other nomenclature for each fixture report. Port authority or line up system information can include unique codes or other nomenclature. Processing can include extraction, aggregation and removal of redundant information. The historical information can include previous locations and actions for identifiable vessels. Processing can include determination most probably operation at locations, allowed operations, port distributions, and the like.

In each of the above examples, the carrier information may be encoded in a difficult to read specific format or in a form requiring additional processing to be read. For example, MI information may be transmitted in plaintext format, such as email, in which location information is referenced according to a multi-letter code. Such codes may not be readily discernable by a layperson without specific knowledge. Additionally, the carrier information source may not provide labels or markers that separate different portions of the carrier information. Accordingly, processing the carrier information can include parsing the different portions of the information, translating specific coding, or supplementing information included in the carrier information with additional contextual information. In some embodiments, the carrier information processing service 122 can generate user interfaces or information utilized by the user devices 102 that correspond to a human readable or human interpretable version of the processed carrier information.

At (3), the carrier information processing service 122 generates path scenarios from processed raw information. Illustratively, the carrier information processing service 122 can utilize the processed raw information to form one or more skeleton scenario paths that identify one or more locations and possible actions at each location for identifiable vessels. Each skeleton scenario path can include various anchor points that will function as identifiable reference points for combining or aggregating the skeleton scenario paths. Illustratively, the anchor points can include identifiable locations in voyage information that can be matched when compared. Each different type of information source can be processed to generate the skeleton scenario path. For example, the carrier information processing service 122 can utilized the AIS information to identify future destinations and any action that can be attributed to the identifiable location. For MI information, the carrier information processing service 122 can identify different types of locations (e.g., ports, waypoints, shipyards, etc.) and attempts to associate a different activity based on the type of location. For fixture information, the carrier information processing service 122 can utilize complete load and discharge information to generate the skeleton scenario paths. For Port Authority information, the carrier information processing service 122 can utilize complete load and discharge information to generate the skeleton scenario paths. For each of the above information examples and for custom user, the carrier information processing service 122 can include estimations or guesses for possible next scenarios.

At (4), the carrier information processing service 122 evaluates the path scenarios. Illustratively, the carrier information processing service 122 can first combine the various skeleton scenario paths by associating the anchor points in the scenario skeleton paths. If the combined paths contain only port level information, the path is considered complete. For any remaining paths that are not combinable, the carrier information processing service 122 can create a graph of all possible permissible paths and assign weights to each graph based on probability of each variation/alternative. The weights can illustratively be based on historical voyage information as input or other expert information sources. The resulting path with the least (or most) weight will be considered the least (or most) probable path.

Illustratively, for each completed path, the carrier information processing service 122 can then assign or apply a penalty model related to the locations and activities associated with the identified locations and activities in each target completed path. For example, the carrier information processing service 122 can assign penalties for certain activities, such as repairs or stops, that may not be indicative of vessels in voyage. In another example, the carrier information processing service 122 can associate penalties for multiple discharge and loading activities that exceed a threshold or that otherwise are not indicative of typical activities. The carrier information processing service 122 can also utilize control rules that associate a degree of suitability of the locations and actions in the complete target path and associate a score attributable to the control rules. The control rules attempt to score locations and actions that are matched from multiple sources, which increases the likelihood that the location and actions are correct. Still further, the carrier information processing service 122 can also attribute feasibility of the target paths. Illustratively, feasibility attributes the likelihood that the associated actions are feasible. For example, the carrier information processing service 122 can penalize a path in which a load operation is identified for a vessel that is attributed with a full load. In another example, carrier information processing service 122 can penalize a path in which discharge operation occurs prior to load operations for the cargo. Based on the processing, the carrier information processing service 122 attributes a score for each complete target path.

At (5), the carrier information processing service 122 generates a ranked set of path scenarios for each identifiable vessel. The set of paths are ranked. Additionally, the ranked set of paths can also include a confidence value indicative of the attributed strength of the sorting.

At (6), the carrier information processing service 122 generates path scenario interfaces for display on the user device 102. Illustratively, the path scenario interfaces are responsive to the request received from the user device 102. Such interfaces can include an identification of paths for identified vessels, an identification of possible vessels attributable to a defined port within a time range, a density function associated with the estimated number of possible vessels relative to historical and current information. For example, values below one are indicative of a lower number of available vessels than historically available. Values above one are indicative of a higher number of available vessels. Accordingly, users can utilize the density information to attribute shipping freight values/prices based on available supply. At (7), the user device 102 and carrier information processing service 122 can interact via the interface for additional searching, processing requests and the like.

Figure 5:
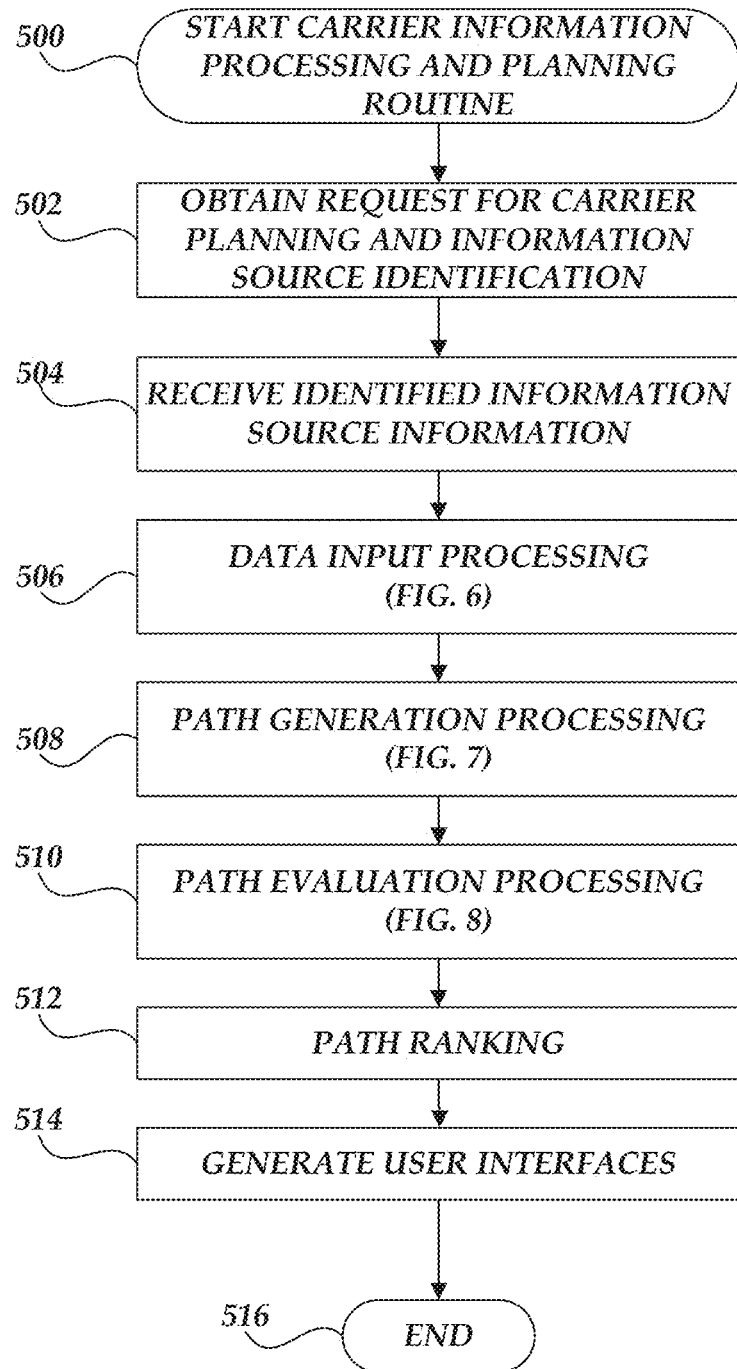
FIG. 5 is a flow diagram illustrative of a carrier information processing and planning routine implemented by a carrier path and shipment planning system in accordance with some embodiments.

Turning now to FIG. 5, a routine 500 for processing carrier information implemented by the carrier information processing service 122 will be described. At block 502, the carrier information processing service 122 receives a request for carrier planning and information source identification. Illustratively, the user device 102 transmits a carrier path and planning request to the carrier information processing service 122. The transmission of the request can include various protocols to establish secure communications and authenticate the user computing device with the carrier information processing service 122. Additionally, the request can identify potential carrier information sources (or credentials), levels of information access (or credentials), and the like. In some embodiments, the carrier information processing service 122 can maintain and utilize profiles so that the request from user device 102 would not necessarily require the transmission of credentials each time. Additionally, for purposes of the illustration, the request can also identify search criteria (or access default criteria) that can identify particular ports of interest, dates of shipping, types of cargo, and the like.

As described above, the carrier information processing service 122 processes the request from the user device 102 and identifies the carrier information sources 130. Illustratively, the identification of the carrier information sources can be based on credentials included in the request or maintained in a profile. In other embodiments, the carrier information processing service 122 can process information about the user computing device 102 request to identify information sources including information sources not identified by the user or user request. For example, individual information sources may provide criteria that indicate user eligibility for information.

Still further, the carrier information processing service 122 configures conditional access rules that identify the level or type of information that users may access for path planning. As described above, in one embodiment, the carrier information processing service 122 can filter or otherwise assign information provided by carrier information sources 130 based on conditional accesses rules. The conditional access rules illustratively facilitate the carrier information processing service 122 processing received carrier information based on user credentials, time of day, and other criteria. The conditional access rules can be maintained on a per user basis, per carrier information source basis or both.

At block 504, the carrier information processing service 122 and a plurality of information sources 130 exchange raw information sources related to the travel of carrier equipment, such as vessels. By way of example, the plurality of information sources can include one or more AIS information sources that described various information about the vessels, including vessel attributes, location, movement, direction and stated voyage. The plurality of information sources can also include marketing intelligence system information sources that can include various information regarding the intended voyage locations for identifiable vessels or carriers provided by independent third-parties, such as broker reports. The plurality of information can also include one or more fixture information sources that identify information regarding cargo loading/discharging and capacity for identifiable vessels. The plurality of information sources can further include one or more port authority information sources that identify various information regarding actions associated with identifiable vessels, cargo and attributable actions (e.g., loading, discharging, etc.). The plurality of information sources can also include one or more user input information sources that correspond to custom or manually entered information about identifiable vessels. The plurality of information sources can also include one or more historical information sources for relaying information regarding historical voyages for identifiable vessels or carriers.

Illustratively, the carrier information processing service 122 can receive multiple information, process the information to form one or more target voyages for identifiable vessels. In some embodiments, the information sources can be attributed to conflicting or incomplete information.

Although the operation of the carrier information processing service 122 will be described with regard to the plurality of information sources, one skilled in the relevant art will appreciate that the plurality of information sources is not required to be any particular combination of the illustrative sources utilized in the illustrative examples. In some embodiments, the information sources 130 may transmit raw information sources directly to the carrier information processing service 122 based on a request (pull) or registration (push). Such transmissions may be based on receipt of new information, time of day, and the like. Additionally, in other embodiments, the information sources 130 can implement various additional interactions or communication protocols, such as APIs, to facilitate the transmission of carrier information.

At block 506, the carrier information processing service 122 processes the various raw information sources from the carrier information source 130. Illustratively, each raw information source can be formatted and transmitted in a different manner. Accordingly, processing the raw information to extract or parse relevant information for forming potential voyage paths may be unique for each type of information source. For example, AIS information can include vessel location information and additional information about the vessel. MI information can include unique codes or other nomenclature for each third-party reports. Fixture information can also include unique codes or other nomenclature for each fixture report. Port authority system information can include unique codes or other nomenclature. As described above, for the above-described information, the processing of the information can include extraction, aggregation and removal of redundant information. Additionally, each of the carrier information sources can be in a format that is encoded in an industry specific format. The historical information can include previous locations and actions for identifiable vessels. Processing can include a determination of most probable operation at locations, allowed operations, port distributions, and the like. An illustrative data processing routine will be described with regard to FIG. 6.

At block 508, the carrier information processing service 122 generates path scenarios from processed raw information. Illustratively, the carrier information processing service 122 can utilize the processed raw information to form one or more skeleton scenario paths that identify one or more locations and possible actions at each location for identifiable vessels. Each skeleton scenario path can include various anchor points that will function as identifiable reference points, such as identifiable locations, for combining or aggregating the skeleton scenario paths. Each different type of information source can be processed to generate the skeleton scenario path. For example, the carrier information processing service 122 can utilize the AIS information to identify future destinations and any action that can be attributed to the identifiable location. For MI information, the carrier information processing service 122 can identify different types of locations (e.g., ports, waypoints, shipyards, etc.) and attempts to associate a different activity based on the type of location. For fixture information, the carrier information processing service 122 can utilize complete load and discharge information to generate the skeleton scenario paths. For Port Authority information, the carrier information processing service 122 can utilize complete load and discharge information to generate the skeleton scenario paths. For each of the above information examples and for custom user, the carrier information processing service 122 can include estimations or guesses for possible next scenarios. An illustrative path generation process will be described with regard to FIG. 7. In some embodiments, the scale of the processed information can generate an initial set of skeleton scenario paths that includes a large number of potential paths.

At block 510, the carrier information processing service 122 evaluates the path scenarios. Illustratively, the carrier information processing service 122 can first combine the various skeleton scenario paths by associating the anchor points in the scenario skeleton paths. Illustratively, the combination of skeleton scenario paths by utilizing common anchor points (e.g., common reference locations) can substantially reduce the set of potential paths that will require additional evaluation/scoring as described herein. Such combination results in increased processing efficiency by reducing the redundant evaluation of skeleton scenario paths. Additionally, the reduction of the skeleton scenario paths can decrease the overall processing time of routine 500, which provides overall improved performance of the carrier information processing service 122 and can increase the perception of a real-time response to incoming carrier information. If the combined paths contain complete information for evaluation, such as location information and attributed actions, the path is considered complete. For any remaining paths that are not combinable, the carrier information processing service 122 can create a graph of all possible permissible paths and assign weights to each graph based on probability of each variation/alternative. The weights can illustratively be based on historical voyage information as input or other expert information sources. The resulting path with the least (or most) weight will be considered the least (or most) probable path. For example, the carrier information processing service 122 can utilize graph analysis to find the shortest graphical path based on the graphed probabilities.

Illustratively, for each completed path, the carrier information processing service 122 can then assign or apply a penalty model related to the locations and activities associated with the identified locations and activities in each target completed path. For example, the carrier information processing service 122 can assign penalties for certain activities, such as repairs or stops, that may not be indicative of vessels in voyage. In another example, the carrier information processing service 122 can associate penalties for multiple discharge and loading activities that exceed a threshold or that otherwise are not indicative of typical activities. The carrier information processing service 122 can also utilize control rules that associate a degree of suitability of the locations and actions in the complete target path and associate a score attributable to the control rules. The control rules attempt to score locations and actions that are matched from multiple sources, which increased the likelihood that the location and actions are correct. Still further, the carrier information processing service 122 can also attribute feasibility of the target paths. Illustratively, feasibility attributes the likelihood that the associated actions are feasible. For example, the carrier information processing service 122 can penalize a path in which a load operation is identified for a vessel that is attributed with a full load. In another example, carrier information processing service 122 can penalize a path in which discharge operation occurs prior to load operations for the cargo. Based on the processing, the carrier information processing service 122 attributes a score for each complete target path. An illustrative path evaluation process will be described with regard to FIG. 8.

At block 512, the carrier information processing service 122 generates a ranked set of path scenarios for each identifiable vessel. The ranked set of paths includes a sorting for each path. Additionally, the ranked set of paths can also include a confidence value indicative of the attributed strength of the sorting.

At block 514, the carrier information processing service 122 generates path scenario interfaces for display on the user device 102. Illustratively, the path scenario interfaces are responsive to the request received from the user device 102. Such interfaces can include an identification of paths for identified vessels, an identification of possible vessels attributable to a defined port within a time range, a density function associated with the estimated number of possible vessels relative to historical information. For example, values below one are indicative of a lower number of available vessels than historically available. Values above one are indicative of a higher number of available vessels. Accordingly, users can utilize the density information to attribute shipping values/prices based on available supply. Illustrative interfaces generated by the carrier information processing service 122 will be described with regard to FIGS. 9 and 10. At block 516, the routine 500 terminates.

Figure 6:
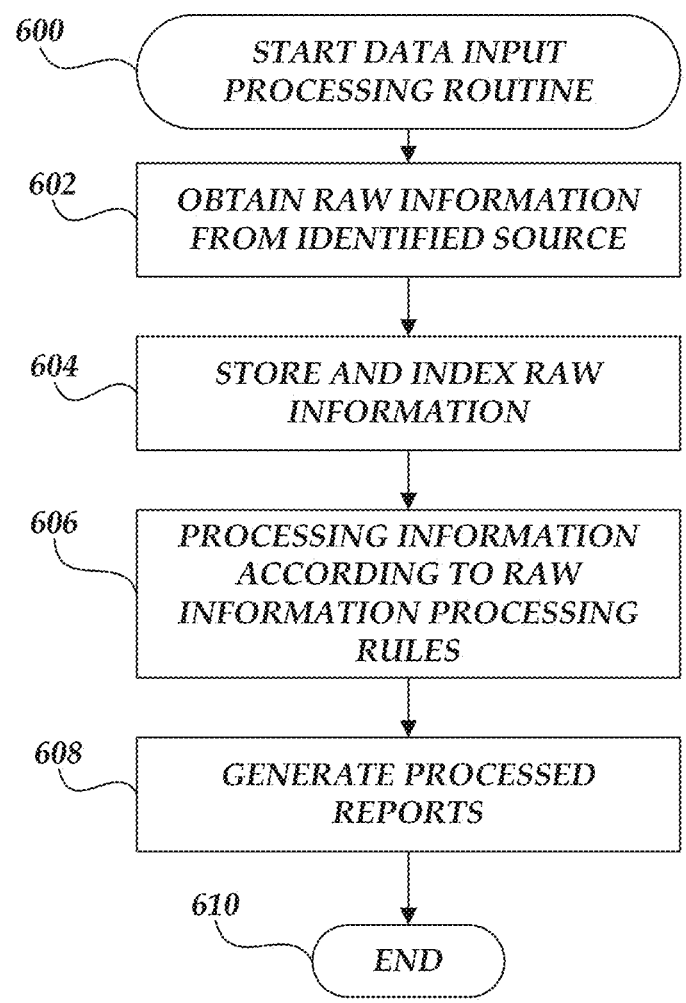
FIG. 6 is a flow diagram illustrative of data input processing routine implemented by a carrier path and shipment planning system in accordance with some embodiments.

Turning now to FIG. 6, a routine 600 implemented by the carrier information processing service 122 for processing raw information sources will be described. At block 602, the carrier information processing service 122 and a plurality of information sources 130 exchange raw information sources related to the travel of carrier equipment, such as vessels. By way of example, the plurality of information sources can include one or more AIS information sources that described various information about the vessels, including vessel attributes, location, movement, direction and stated voyage. The plurality of information sources can also include marketing intelligence system information sources that can include various information regarding the intended voyage locations for identifiable vessels or carriers provided by independent third-parties, such as broker reports. The plurality of information can also include one or more fixture information sources that identify information regarding cargo loading and capacity for identifiable vessels. The plurality of information sources can further include one or more port authority information sources that identify various information regarding actions associated with identifiable vessels, cargo and attributable actions (e.g., loading, discharging, etc.). The plurality of information sources can also include one or more user input information sources that correspond to custom or manually entered information about identifiable vessels. The plurality of information sources can also include one or more historical information sources for relaying information regarding historical voyages for identifiable vessels or carriers. At block 604, the carrier information processing service 122 stores the raw information sources and indexes for future use.

As described previously, the carrier information processing service 122 can receive multiple information, process the information to form one or more target voyages for identifiable vessels. In some embodiments, the information sources can be attributed to conflicting or incomplete information. Although the operation of the carrier information processing service 122 will be described with regard to the plurality of information sources, one skilled in the relevant art will appreciate that the plurality of information sources is not required to be any particular combination of the illustrative sources utilized in the illustrative examples. In some embodiments, the information sources 130 may transmit raw information sources directly to the carrier information processing service 122 based on a request (pull) or registration (push). Such transmissions may be based on receipt of new information, time of day, and the like. Additionally, in other embodiments, the information sources 130 can implement various additional interactions or communication protocols, such as APIs, to facilitate the transmission of carrier information.

At block 606, the carrier information processing service 122 processes the various raw information sources from the carrier information source 130. Illustratively, each raw information source can be formatted and transmitted in a different manner. Accordingly, processing the raw information to extract or parse relevant information for forming potential voyage paths may be unique for each type of information source. For example, AIS information can include vessel location information and additional information about the vessel. MI information can include unique codes or other nomenclature for each third-party reports. Fixture information and port authority system can also include unique codes or other nomenclature for each fixture report. Processing can include extraction and removal of redundant information. As described above, for the above-described information, the processing of the information can include extraction, aggregation and removal of redundant information. Additionally, each of the carrier information sources can be encoded in an industry specific format. Processing can include extraction, aggregation and removal of redundant information. The historical information can include previous locations and actions for identifiable vessels. Processing can include determination most probably operation at locations, allowed operations, port distributions, and the like. At block 608, the carrier information processing service 122 generates processed reports for utilization in the generation of paths. At block 610, the routine 600 terminates.

Figure 7:
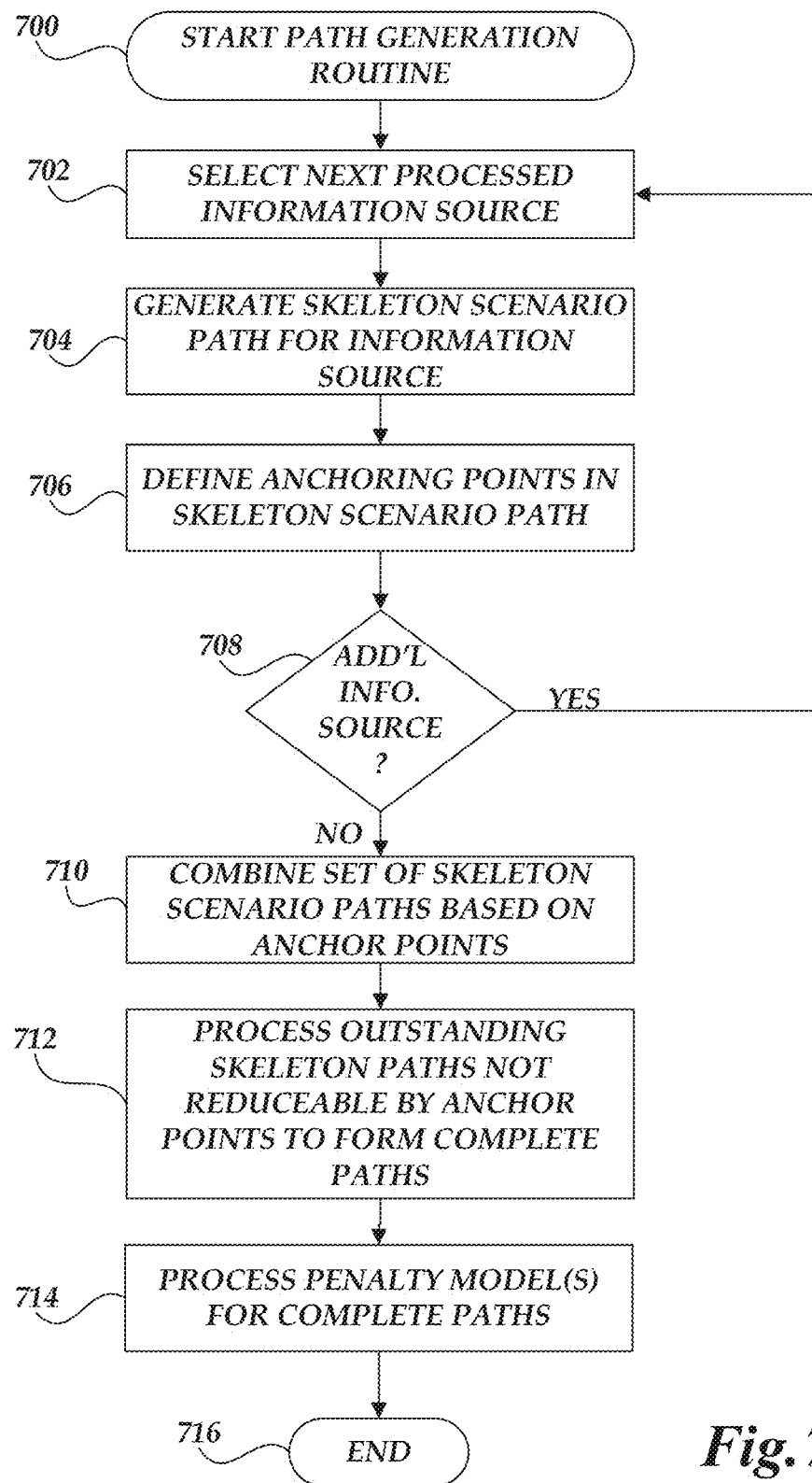
FIG. 7 is a flow diagram illustrative of a path generation routine implemented by a carrier path and shipment planning system in accordance with some embodiments.

With reference to FIG. 7, a routine 700 implemented by the carrier information processing service 122 for generation of target paths will be described. Illustratively, the carrier information processing service 122 can utilize the processed raw information to form one or more skeleton scenario paths that identify one or more locations and possible actions at each location for identifiable vessels.

Accordingly, at block 702, the carrier information processing service 122 enters into an iterative loop by selecting the next processing information. At block 704, the carrier information processing service 122 generates path scenarios from processed raw information. Each skeleton scenario path can include various anchor points that will function as identifiable reference points for combining or aggregating the skeleton scenario paths. Each different type of information source can be processed to generate the skeleton scenario path. For example, the carrier information processing service 122 can utilize the AIS information to identify future destinations and any action that can be attributed to the identifiable location. For MI information, the carrier information processing service 122 can identify different types of locations (e.g., ports, waypoints, shipyards, etc.) and attempts to associate a different activity based on the type of location. For fixture information, the carrier information processing service 122 can utilize complete load and discharge information to generate the skeleton scenario paths. For Port Authority information, the carrier information processing service 122 can utilize complete load and discharge information to generate the skeleton scenario paths. For each of the above information examples and for custom user, the carrier information processing service 122 can include estimations or guesses for possible next scenarios. At block 706, the carrier information processing service 122 defines anchor points in each skeleton scenario path. At decision block 708, a test is conducted to determine whether additional processed raw information sources are available. If so, the routine 700 returns to block 702.

Once all the information sources have been processed, at block 710, the carrier information processing service 122 combines the various skeleton scenario paths by associating the anchor points in the scenario skeleton paths. If the combined paths contain only port level information, the path is considered complete. For any remaining paths that are not combinable, at block 712, the carrier information processing service 122 can create a graph of all possible permissible paths and assign weights to the graph based on estimated probabilities of each variation/alternative. The weights can illustratively be based on historical voyage information as input or other expert information sources. The resulting path with the least (or most) weight will be considered the least (or most) probable path.

Illustratively, for each completed path, at block 714, the carrier information processing service 122 can then assign or apply a penalty model related to the locations and activities associated with the identified locations and activities in each target completed path. For example, the carrier information processing service 122 can assign penalties for certain activities, such as repairs or stops, that may not be indicative of vessels in voyage. In another example, the carrier information processing service 122 can associated penalties for multiple discharge and loading activities that exceed a threshold or that otherwise are not indicative of typical activities. At block 716, the routine 700 terminates.

Figure 8:
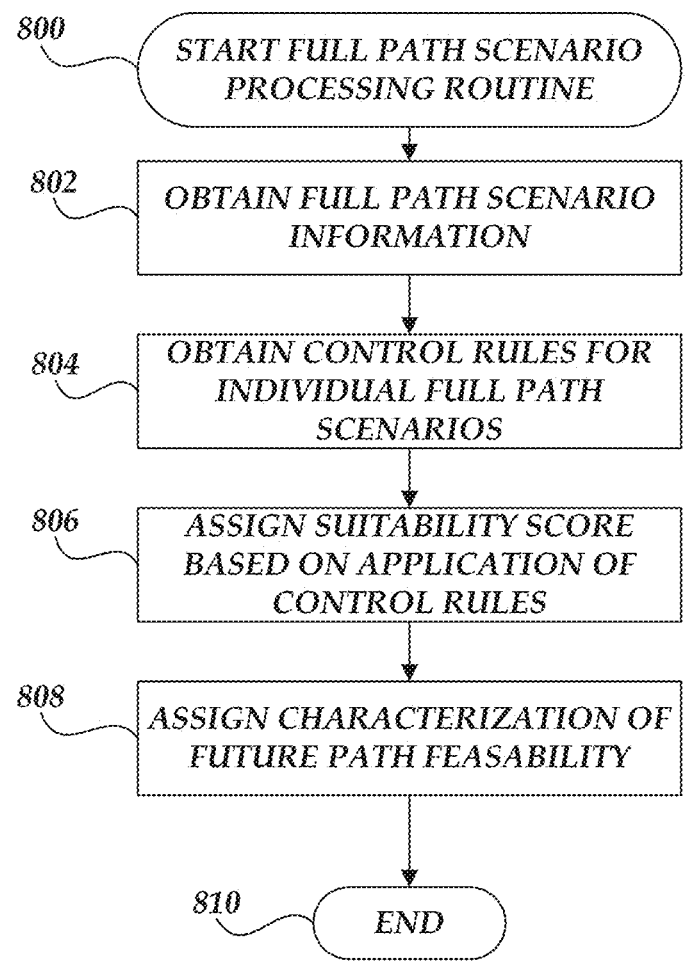
FIG. 8 is a flow diagram illustrative of a full path scenario processing routine implemented by a carrier path and shipment planning system in accordance with some embodiments.

With reference now to FIG. 8, a routine 800 implemented by the carrier information processing service 122 will be described. At block 802, the carrier information processing service 122 obtains the processed target paths. As described above, the carrier information processing service 122 can also utilize control rules that associate a degree of suitability of the locations and actions in the complete target path and associate a score attributable to the control rules. The control rules attempt to score locations and actions that are matched from multiple sources, which increased the likelihood that the location and actions are correct. Accordingly, at block 806, the carrier information processing service 122 determines the suitability score based on application of the controls rules.

Still further, the carrier information processing service 122 can also attribute feasibility of the target paths. Illustratively, feasibility attributes the likelihood that the associated actions are feasible. At block 808, the carrier information processing service 122 assigns a score of future path suitability. For example, the carrier information processing service 122 can penalize a path in which a load operation is identified for a vessel that is attributed with a full load. In another example, carrier information processing service 122 can penalize a path in which discharge operation occurs prior to load operations for the cargo. Based on the processing, the carrier information processing service 122 attributes a score for each complete target path. At block 810, the routine 810 terminates.

Figure 10:
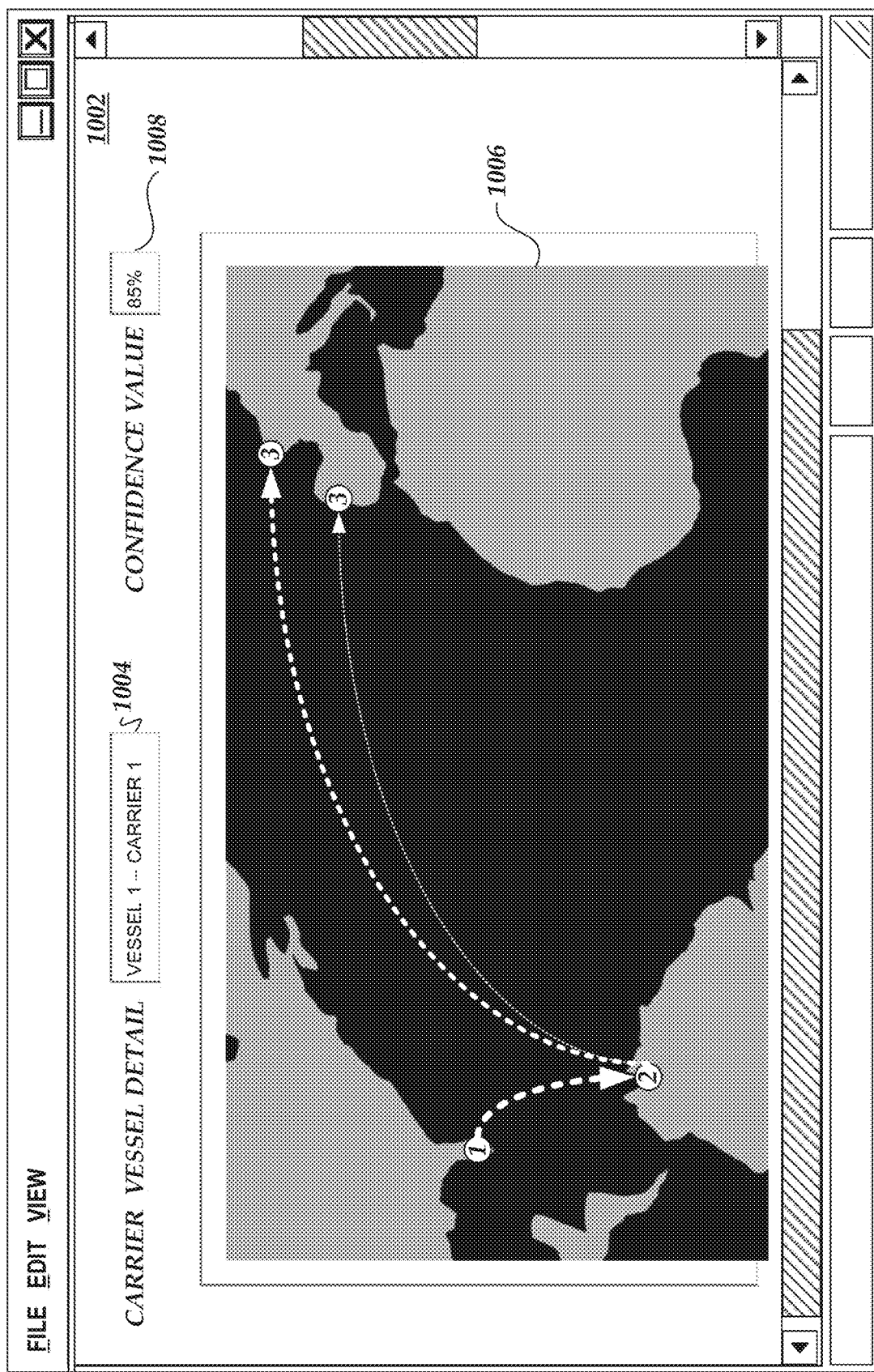
FIG. 10 is a block diagram illustrative of a user interface generated on a user device identifying carrier information in accordance with some embodiments.

Turning now to FIGS. 9 and 10, illustrative interfaces generated by the carrier information processing service 122 will be described. With reference to FIG. 9, a first interface 902 can be utilized to search information from a user. Illustratively, the screen interface 902 can include controls for identify shipping ports 904, 906, shipping dates 908, 910, destination ports 912, 914 and cargo types 916, 918. The fields can include various information that can be manually entered into the interface, extracted from profiles or populated with default information. Additionally, the interface 902 can include alternative fields or data entry models for obtaining the information.

The screen interface 902 can also include an identification of set of vessels 920 that have an estimated path that is predicted to be able to satisfy the entered search criteria. The list may be stacked ranked based on the calculated score, which can be indicative of the confidence value of the predicated path. The list may also be stack ranked based on user preferences for specific carriers or vessels or based on historical use of a carrier or vessel. The screen interface can further include a description of value index. As described above, the value index can correspond to a density function associated with the estimated number of possible vessels relative to historical information. For example, values below one are indicative of a lower number of available vessels than historically available. Values above one are indicative of a higher number of available vessels. Accordingly, users can utilize the density information to attribute shipping values/prices based on available supply.

With reference now to FIG. 10, an interface 1002 generated by the carrier information processing service 122 for display on a user device 102 will be described. Interface 1002 corresponds to details about the estimate voyage of an identified vessel. The interface includes fields for identifying the vessel 1004 and a confidence value for the estimated path 1006. As described above, the confidence value can correspond to the ranking score generated by the carrier information processing service 122.

The interface can also include a graphical representation of the projected voyage 1006. The graphical representation can identify one or more locations, actions associated with each location and possible alternatives if multiple paths have been identified. In one embodiment, the different alternatives may be identifying or characterized using different visual cues to identify confidence values for each alternative. Illustratively, the confidence value can be representative of the penalty values, the suitability scores, the feasibility scores or other calculation. The visual cues can be based on different colors, line weights, fonts, and the like. Additionally, the screen interface can include additional graphical icons or cues that graphically represent attributes of the path locations (e.g., types of actions, etc.).

One or more aspects of the present application can include the following:

Clause 1: A system for determining availability of shipping vessels for future shipping voyages based on a dynamic set of vessel information sources comprising:

one or more computing devices associated individual vessel information sources, wherein the individual vessel information sources transmit vessel information associated with individual vessels;

one or more computing devices associated with a vessel path and shipment planning service, wherein the vessel path and shipment planning service is configured to:

obtain a request for vessel planning and information source identification corresponding to possible vessels for contracting;

receive a set of vessel information from a plurality of vessel information sources including at least a first set of non-indexed vessel data from a first vessel information source and a second set of non-indexed vessel data from a second vessel information source, the first and second sets of vessel data being formatted differently;

index the first and second sets of non-indexed vessel data with vessel identity data portions, vessel location data portions, and vessel loading status data portions, so as to generate first and second sets of indexed vessel data;

process the set of vessel information including the first and second sets of indexed vessel data to form a number of skeleton scenario paths for identifiable vessels, wherein individual skeleton scenario paths for a vessel are defined by one or more anchor points;

combine the plurality of skeleton scenario paths to form a number of target paths for individual identifiable vessels, wherein the plurality of skeleton scenario paths are combined according to common anchor points such that the number of resulting target paths is fewer than the number of skeleton scenario paths;

determining feasibility of target paths based on vessel size and forecast weather conditions along each of the target paths according to control rules, wherein individual target paths are scored according to the control rules;

apply a penalty model to the target paths, the penalty model reflective of the location information included in the target paths;

generate a ranked list of the target paths for the individual identifiable vessels; and for a requested location, generate an interface responsive to the request for vessel planning and information source identification identifying at least a subset of the identified individual vessels based on the generated ranked list of target paths and a value indicator associated with a density of the at least a subset of the identified individual vessels.

Clause 2: The system of claim 1, wherein the individual vessel information sources transmit two or more types of vessel information associated with individual vessels and wherein access to individual types of vessel information is based on one or more attributes associated with a user.

Clause 3: The system of claim 2, wherein the vessel path and shipment planning service receives the set of vessel information from the plurality of vessel information sources based on submitted attributes associated with the user.

Clause 4: The system of claim 1, wherein the control rules applied by the vessel path and shipment planning service associate a score to a target path based on a determined degree of suitability for the target path.

Clause 5: A system for managing interaction with carriers based on a dynamic set of carrier information sources comprising:

one or more computing devices associated individual carrier information sources, wherein the individual carrier information sources transmit carrier information associated with individual vessels;

one or more computing devices associated with a carrier path and shipment planning service, wherein the carrier path and shipment planning service is configured to:

obtain a request for carrier planning and information source identification corresponding to possible vessels for contracting;

receive a set of carrier information from a plurality of carrier information sources;

process the set of carrier information to form a plurality of skeleton scenario paths for identifiable vessels, wherein individual skeleton scenario paths for a vessel are defined by one or more anchor points;

combine the plurality of skeleton scenario paths to form target paths for individual identifiable vessels, wherein the plurality of skeleton scenario paths are combined according to common anchor points and wherein individual target paths are scored according to control rules;

apply a penalty model to the target paths, the penalty model reflective of the location information included in the target paths;

generate a ranked list of the target paths for the individual identifiable vessels; and for a requested location, generate an interface responsive to the request for carrier planning and information source identification identifying at least a subset of the identified individual vessels based on the generated ranked list of target paths and a value indicator associated with a density of the at least a subset of the identified individual vessels.

Clause 6: The system of claim 5, wherein the individual carrier information sources transmit two or more types of carrier information associated with individual vessels and wherein access to individual types of carrier information is based on one or more attributes associated with a user.

Clause 7: The system of claim 6, wherein the carrier path and shipment planning service receives the set of carrier information from the plurality of carrier information sources based on submitted attributes associated with the user.

Clause 8: The system of claim 5, wherein the control rules applied by the carrier path and shipment planning service associate a score to a target path based on a determined degree of suitability for the target path.

Clause 9: The system of claim 5, wherein the control rules applied by the carrier path and shipment planning service associate a score to a target path based on a determined degree of feasibility for the target path.

Clause 10: The system of claim 5, wherein the interface includes at least one display characteristic indicative of a degree of confidence associated with a target path for the identified individual vessels.

Clause 11: A computer-implemented method for generating an interface from information associated with carriers comprising:

obtaining a request for carrier planning and information source identification corresponding to possible vessels for contracting at a defined location;

processing a set of carrier information for identifiable vessels to form one or more target paths for individual identifiable vessels, wherein individual target paths are scored according to control rules;

generating a ranked list of the target paths for the individual identifiable vessels; and for the defined location, generating an interface responsive to the request for carrier planning and information source identification identifying at least a subset of the identified individual vessels based on the generated ranked list of target paths.

Clause 12: The computer-implemented method as recited in claim 11 further comprising receiving a set of carrier information from a plurality of carrier information sources, wherein the individual carrier information sources transmit carrier information associated with the individual identifiable vessels.

Clause 13: The computer-implemented method of claim 12, wherein the individual carrier information sources transmit two or more types of carrier information associated with individual vessels and wherein access to individual types of carrier information is based on one or more attributes associated with a user.

Clause 14: The computer-implemented method of claim 13, wherein receiving the set of carrier information from the plurality of carrier information sources includes receiving at least one of the two or more types of carrier information based on submitted attributes associated with the user.

Clause 15: The computer-implemented method of claim 11, wherein processing a set of carrier information for identifiable vessels to form one or more target paths for individual identifiable vessels includes:
  forming a plurality of skeleton scenario paths for identifiable vessels, wherein individual skeleton scenario paths for a vessel are defined by one or more anchor points; and
  combining the plurality of skeleton scenario paths to form target paths for individual identifiable vessels, wherein the plurality of skeleton scenario paths are combined according to common anchor points.

Clause 16: The computer-implemented method of claim 11, wherein the control rules applied by the carrier path and shipment planning service associate a score to a target path based on a determined degree of suitability for the target path.

Clause 17: The computer-implemented method of claim 16, wherein the degree of suitability corresponds to matching location information for locations included in the target path.

Clause 18: The computer-implemented method of claim 11, wherein the control rules applied by the carrier path and shipment planning service associate a score to a target path based on a determined degree of feasibility for the target path.

Clause 19: The computer-implemented method of claim 18, wherein the degree of feasibility corresponds to processing activities associated with locations included in the target path.

Clause 20: The computer-implemented method of claim 11, wherein the interface includes at least one display characteristic indicative of a degree of confidence associated with a target path for the identified individual vessels.

Clause 21: A computer-implemented method for managing information associated with carriers comprising:
  processing a set of carrier information for identifiable vessels to form one or more target paths for individual identifiable vessels, wherein individual target paths are scored according to control rules;
  generating a ranked list of the target paths for the individual identifiable vessels; and
  characterizing at least a subset of the identified individual vessels as associated with specified locations and dates based on the generated ranked list of target paths.

Clause 22: The computer-implemented method as recited in claim 21 further comprising receiving a set of carrier information from a plurality of carrier information sources, wherein the individual carrier information sources transmit carrier information associated with the individual identifiable vessels.

Clause 23: The computer-implemented method of claim 22, wherein the individual carrier information sources transmit two or more types of carrier information associated with individual vessels and wherein access to individual types of carrier information is based on one or more attributes associated with a user.

Clause 24: The computer-implemented method of claim 22, wherein receiving the set of carrier information from the plurality of carrier information sources includes receiving at least one of the two or more types of carrier information based on submitted attributes associated with the user.

Clause 25: The computer-implemented method of claim 22 further comprising filtering at least one of the two or more types of carrier information based on submitted attributes associated with the user.

Clause 26: The computer-implemented method of claim 22, wherein processing the set of carrier information for identifiable vessels to form one or more target paths for individual identifiable vessels includes:
  forming a plurality of skeleton scenario paths for identifiable vessels, wherein individual skeleton scenario paths for a vessel are defined by one or more anchor points; and
  combining the plurality of skeleton scenario paths to form target paths for individual identifiable vessels, wherein the plurality of skeleton scenario paths are combined according to common anchor points.

Clause 27: The computer-implemented method of claim 21, wherein the control rules applied by the carrier path and shipment planning service associate a score to a target path based on a determined degree of suitability for the target path.

Clause 28: The computer-implemented method of claim 27, wherein the degree of suitability corresponds to matching timing information for locations included in the target path.

Clause 29: The computer-implemented method of claim 21, wherein the control rules applied by the carrier path and shipment planning service associate a score to a target path based on a determined degree of feasibility for the target path.

Clause 30: The computer-implemented method of claim 29, wherein the degree of feasibility corresponds to matching predicted activities with one or more historic activities in the target path.

Clause 31: The computer-implemented method of claim 21, wherein characterizing at least a subset of the identified individual vessels as associated with specified locations and dates based on the generated ranked list of target paths includes generating an interface responsive to the request for carrier planning and information source identification identifying at least a subset of the identified individual vessels based on the generated ranked list of target paths.

Clause 32: The computer-implemented method of claim 31, wherein the interface includes at least one display characteristic indicative of a degree of confidence associated with a target path for the identified individual vessels.

Clause 33: The computer-implemented method of claim 31, wherein the interface includes a value indicator associated with a density of the at least a subset of the identified individual vessels.

Clause 34: A system for managing interaction with carriers based on a dynamic set of carrier information sources comprising:
  one or more computing devices associated individual carrier information sources, wherein the individual carrier information sources transmit carrier information associated with individual vessels;
  one or more computing devices associated with a carrier path and shipment planning service, wherein the carrier path and shipment planning service is configured to:
    process a set of carrier information for a plurality of vessels to form one or more target paths for individual identifiable vessels, wherein individual target paths are scored according to control rules;
    generate a ranked list of the target paths for the individual identifiable vessels; and characterize at least a portion of the plurality of individual vessels as associated with specified locations and dates based on the generated ranked list of target paths.

Clause 35: The system of claim 34, wherein the individual carrier information sources transmit two or more types of carrier information associated with individual vessels and wherein access to individual types of carrier information is based on one or more attributes associated with a user.

Clause 36: The system of claim 35, wherein the carrier path and shipment planning service receives the set of carrier information from the plurality of carrier information sources based on submitted attributes associated with the user.

Clause 37: The system of claim 34, wherein the control rules applied by the carrier path and shipment planning service associate a score to a target path based on a determined degree of suitability for the target path.

Clause 38: The system of claim 34, wherein the control rules applied by the carrier path and shipment planning service associate a score to a target path based on a determined degree of feasibility for the target path.

Clause 39: The system of claim 34, wherein the interface includes at least one display characteristic indicative of a degree of confidence associated with a target path for the identified individual vessels.

Clause 40: The system of claim 34, wherein the carrier path and shipment planning service is further configured to obtain a request for carrier planning and information source identification corresponding to possible vessels for contracting;

Clause 41: The system of claim 34, wherein the carrier path and shipment planning service processes the set of carrier information for the plurality of vessels to form one or more target paths for individual identifiable vessels by processing the set of carrier information to form a plurality of skeleton scenario paths for identifiable vessels, wherein individual skeleton scenario paths for a vessel are defined by one or more anchor points;

Clause 42: The system of claim 41, wherein the carrier path and shipment planning service processes the set of carrier information for a plurality of vessels to form one or more target paths for individual identifiable vessels by combining the plurality of skeleton scenario paths to form target paths for individual identifiable vessels, wherein the plurality of skeleton scenario paths are combined according to common anchor points and wherein individual target paths are scored according to control rules;

Clause 43: The system of claim 34, wherein the carrier path and shipment planning service processes the set of carrier information for a plurality of vessels to form one or more target paths for individual identifiable vessels by applying a penalty model to the target paths, the penalty model reflective of the location information included in the target paths;

Clause 44: The system of claim 34, wherein the carrier path and shipment planning service characterizes at least a subset of the identified individual vessels as associated with specified locations and dates based on the generated ranked list of target paths includes generating an interface responsive to the request for carrier planning and information source identification identifying at least a subset of the identified individual vessels based on the generated ranked list of target paths.

Clause 45: The system of claim 44, wherein the interface includes at least one display characteristic indicative of a degree of confidence associated with a target path for the identified individual vessels.

Clause 46: The system of claim 44, wherein the interface includes a value indicator associated with a density of the at least a subset of the identified individual vessels.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method for generating an interface from information associated with carriers comprising:
    obtaining a set of carrier information for individual identifiable vessels;
    forming a plurality of skeleton scenario paths for the individual identifiable vessels from the set of carrier information wherein each skeleton scenario path of the plurality of skeleton scenario paths for the individual identifiable vessels is defined by one or more anchor points formed from different carrier information;
    automatically combining the plurality of skeleton scenario paths to form a plurality of target paths for the individual identifiable vessels, wherein the plurality of skeleton scenario paths are combined according to common anchor points;
    generating a ranked list of the plurality of target paths for the individual identifiable vessels based on application of a scoring function; and
    for defined locations, generating an interface responsive to a request for carrier planning and information source identification identifying a value indicator associated with a density of at least subset of individual identifiable vessels.

2. The computer-implemented method as recited in claim 1 further comprising obtaining the request for carrier planning and information source identification including an identification of one or more defined locations.

3. The computer-implemented method as recited in claim 1, wherein application of the scoring function includes scoring the plurality of target paths according to control rules recalled from a control rules memory and defining a scoring function to be applied to the target path, wherein the control rules are applied to the plurality of target paths.

4. The computer-implemented method of claim 3, wherein the control rules applied by a carrier path and shipment planning service associate a score to a target path based on a determined degree of suitability for the target path.

5. The computer-implemented method of claim 4, wherein the degree of suitability corresponds to matching location information to locations included in the target path.

6. The computer-implemented method of claim 3, wherein the control rules applied by a carrier path and shipment planning service associate a score to a target path based on a determined degree of feasibility for the target path.

7. The computer-implemented method of claim 6, wherein the degree of feasibility corresponds to processing activities associated with locations included in the target path.

8. The computer-implemented method as recited in claim 1 further comprising receiving a set of carrier information from a plurality of carrier information sources.

9. The computer-implemented method as recited in claim 1, wherein the set of carrier information is received in accordance with specific application programming information, wherein individual application programming information corresponds to a different format of carrier information.

10. The computer-implemented method as recited in claim 9 further comprising processing the set of carrier information by applying data transformations corresponding to a specific application programming information to remove duplicative data.

11. The computer-implemented method of claim 9, wherein the set of carrier information includes two or more types of carrier information associated with individual identifiable vessels and wherein receiving the set of carrier information from the plurality of carrier information sources includes receiving carrier information based on submitted attributes associated with the user.

12. The computer-implemented method of claim 11, wherein interface responsive to a request for carrier planning and information source identification identifying a value indicator associated with a density of at least subset of individual identifiable vessels is based on one or more attributes associated with a user.

13. The computer-implemented method of claim 1, wherein the interface responsive to a request for carrier planning and information source identification further includes identifying at least the subset of individual identifiable vessels.

14. The computer-implemented method of claim 13, wherein the interface includes at least one display characteristic indicative of a degree of confidence associated with a target path for the individual identifiable vessels.

15. The computer-implemented method of claim 1, wherein generating a ranked list of the plurality of target paths for the individual identifiable vessels based on application of a scoring function includes applying a penalty model to the plurality of target paths, the penalty model reflective of location information included in the plurality of target paths.

16. A system for managing interaction with carriers based on a dynamic set of carrier information sources comprising:
one or more computing devices associated with individual carrier information sources, wherein the individual carrier information sources transmit carrier information associated with individual vessels via application protocol interfaces, wherein at least a portion of the carrier information associated with individual vessels include information in a non-human discernable format;
one or more computing devices associated with a carrier path and shipment planning service, wherein a processor of the carrier path and shipment planning service executes computer readable instructions stored in a non-transitory computer medium that when executed cause the processor of the carrier path and shipment planning service to:
form a set of carrier information, the set of carrier information obtained from a plurality of carrier information sources via various different formats defined according to individual application programming interfaces and having been processed to extract non-duplicative data attributes;
process the set of carrier information to form a plurality of skeleton scenario paths for identifiable vessels, wherein each individual skeleton scenario path of the plurality of skeleton scenario paths for a vessel are defined by one or more anchor points provided by a combination of different carrier information obtained from the plurality of carrier information sources in the set of carrier information;
automatically combine the plurality of skeleton scenario paths to form target paths for individual identifiable vessels, wherein the plurality of skeleton scenario paths are combined according to common anchor points and wherein one or more of the target paths are scored according to control rules and wherein a number of formed target paths are less than a number of skeleton scenario paths; and
for identified locations, generate an interface responsive to the request for carrier planning and information source identification identifying at least a subset of the individual identifiable vessels based on the generated ranked list of the formed target paths based on a calculated degree of confidence associated with a target path for the individual identifiable vessels.

17. The system as recited in claim 16, wherein the interface further includes a value indicator associated with a density of the at least subset of the individual identifiable vessels.

18. The system of claim 16, wherein the individual carrier information sources transmit two or more types of carrier information associated with individual vessels, wherein access to the two or more types of carrier information is based on one or more attributes associated with a user defined in a user profile recalled from memory, and wherein the carrier path and shipment planning service filters the received set of carrier information based on user profile information.

19. The system of claim 16, wherein the carrier path and shipment planning service receives the set of carrier information from the plurality of carrier information sources based on submitted attributes associated with the user.

20. The system of claim 16, wherein the degree of confidence associated with a target path for the individual identifiable vessels is based on a determined degree of feasibility for the target path based on application of the control rules.

21. A computer-implemented method for generating an interface from information associated with carriers comprising:
forming a plurality of skeleton scenario paths for the individual identifiable vessels from a set of carrier information, wherein each skeleton scenario path of the plurality of skeleton scenario paths for the individual identifiable vessels is defined by one or more anchor points formed from different carrier information;
automatically combining the plurality of skeleton scenario paths to form a plurality of target paths for the individual identifiable vessels, wherein the plurality of skeleton scenario paths are combined according to common anchor points;
scoring the plurality of target paths according to control rules recalled from a control rules memory and defining a scoring function to be applied to the target path, wherein the control rules are applied to the plurality of target paths;
for defined locations, generating an interface responsive to a request for carrier planning and information source identification identifying a calculated degree of confidence associated with a target path for the individual identifiable vessels.

* * * * *